US011983908B2

(12) United States Patent
Salter et al.

(10) Patent No.: US 11,983,908 B2
(45) Date of Patent: May 14, 2024

(54) SYSTEMS AND METHODS FOR CONTROLLING A WINDOW HEATING ELEMENT

(71) Applicant: Ford Global Technologies, LLC, Dearborn, MI (US)

(72) Inventors: Stuart C. Salter, White Lake, MI (US); Katherine Howard-Cone, Canton, MI (US); John Robert Van Wiermeersch, Novi, MI (US); Hussein Berry, Dearborn, MI (US); John Budaj, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 792 days.

(21) Appl. No.: 17/060,726

(22) Filed: Oct. 1, 2020

(65) Prior Publication Data

US 2022/0105781 A1    Apr. 7, 2022

(51) Int. Cl.
| G06V 10/00 | (2022.01) |
| B60S 1/00 | (2006.01) |
| B60S 1/02 | (2006.01) |
| B60S 1/08 | (2006.01) |
| B60S 1/60 | (2006.01) |
| H05B 1/02 | (2006.01) |
| H05B 3/86 | (2006.01) |

(52) U.S. Cl.
CPC ............... *G06V 10/00* (2022.01); *B60S 1/00* (2013.01); *B60S 1/026* (2013.01); *H05B 1/0236* (2013.01); *B60S 1/0844* (2013.01); *B60S 1/603* (2013.01); *H05B 3/86* (2013.01)

(58) Field of Classification Search
CPC .......... B60S 1/00; B60S 1/026; B60S 1/0844; B60S 1/603; G06V 10/00; G06V 10/82; G06V 20/59; H05B 1/0236; H05B 3/86
See application file for complete search history.

(56) References Cited

U.S. PATENT DOCUMENTS

| 6,853,897 | B2 | 2/2005 | Stam et al. |
| 10,011,226 | B2 * | 7/2018 | Stein ..................... B60S 1/0844 |
| 11,001,231 | B1 * | 5/2021 | Hedman ............... B60S 1/0844 |
| 11,167,726 | B2 * | 11/2021 | Hu .......................... B60R 11/04 |
| 2013/0208120 | A1 | 8/2013 | Hirai et al. |
| 2014/0070698 | A1 | 3/2014 | Pierce et al. |
| 2017/0332010 | A1 | 11/2017 | Asakura et al. |
| 2019/0061468 | A1 | 2/2019 | Reed |

FOREIGN PATENT DOCUMENTS

CN    108202696 A    6/2018

OTHER PUBLICATIONS

A. Aroussi, et al.,"An Assessment of Vehicle Side-Window Defrosting and Demisting Process", SAE Technical Paper Series. SAE International University of British Columbia, Thursday, Aug. 2, 2018 (9 pages).
Search Report—www.anovip.com. (26 pages).

* cited by examiner

*Primary Examiner* — Dana Ross
*Assistant Examiner* — Joe E Mills, Jr.
(74) *Attorney, Agent, or Firm* — Frank Lollo; Eversheds Sutherland (US) LLP (57) ABSTRACT

The disclosure describes systems and methods for controlling a heating element of a window of a vehicle. The systems and methods include capturing an image of the window with a camera of the vehicle. The image is analyzed to determine a state of the window and the heating element is controlled based on the state of the window.

16 Claims, 4 Drawing Sheets

SYSTEMS AND METHODS FOR CONTROLLING A WINDOW HEATING ELEMENT

BACKGROUND

With electric vehicles, and growing electrical feature content on all vehicles classes, loads on the power supply system are increasing, and it is therefore important to look for power-saving opportunities.

The rear window defroster is used to heat a window on a cold winter day or a humid day to defrost or defog the window. The defroster is turned on when the customer presses a control button and stays on until the customer presses the button again or when a timer elapses. Because the defroster does not automatically turn off if the window is clear before the timer elapses, the defroster continues to draw current and consume energy from the power supply system unnecessarily.

It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure is directed to the systems and methods for control of a window heating element. By providing advanced control of the window heating element, the heating element is automatically turned off if the window is clear and thus does not continue to consume energy from the power supply system unnecessarily.

A window of the vehicle is heated with a heating element of the vehicle. An image of the window is captured with a camera of the vehicle. The image is analyzed by an analysis module to determine a state of the window. For example, the state of the window includes a first state that is one of frosted or fogged and a second state that is clear. The term frosted may include small white crystals and/or ice. That is, the term frosted in meant to encompass a wide range of conditions effecting the window, including one or more of fog, frost, ice (light or heavy), snow (light or heavy), etc.

The heating element is controlled based on the state of the window. The heating element is controlled to remain on if the state is frosted or fogged and the heating element is controlled to turn off if the state is clear.

In some instances, a light of the vehicle or a light separate from and proximate the vehicle (e.g., a light from another vehicle and/or a light from the surrounding environment, such as a building or the like) is controlled to illuminate the window at the same time the camera is controlled to capture the image of the window. The light provides light to diffract off of frost/fog crystals on the glass of the window, for example, in dark or low-visibility situations.

A wiper of the vehicle may be controlled to swipe over the window at the same time the camera is controlled to capture the image of the window. Here, the image of the window includes the wiper. Including the image of the wiper may facilitate determining a status of the window. For example, if the light is activated, a characteristic reflection off the wiper may be recognized in the image for states where the window is frosted or fogged, and a different characteristic reflection can be recognized if the window is clear.

In addition, the wiper may be controlled to move over the window before the camera is controlled to capture the image of the window. Here, the wiper can assist with defrosting/defogging the window and facilitate obtaining an image that most clearly reflects the amount of heating that remains to clear the window. The use of the wiper minimizes the amount of defrosting/defogging to be performed by the heating element. As an example, operating the wiper may change the state of the window from frosted/fogged to clear, which is recognized by the system as described below, and the heating element is shut off to save energy. Additionally, the window washer fluid pump may be activated to apply anti-freeze glass cleaner to help facilitate cleaning the window. The control system described may determine the order and duration of the combinations of wiper action, fluid application, and defrost actions to optimize window clearing with the least amount of power.

The state of the window may be based on a confidence level that the state of the window is the first state. For example, the state of the window is the first state if the confidence level is above an upper threshold and the state of the window is the second state if the confidence level is below a lower threshold. Here, if the confidence level is below the upper threshold and above the lower threshold, a humidity measurement in the vehicle is additionally used to control the heating element.

The humidity measurement in the vehicle is made with a humidity sensor of the vehicle and/or via humidity readers obtained by offboard sensors or local weather reports. The heating element is controlled to turn off when the humidity measurement is below a humidity threshold and remains on when the humidity measurement is above the humidity threshold.

These and other advantages of the present disclosure are provided in greater detail herein.

Illustrative Embodiments

The disclosure will be described more fully hereinafter with reference to the accompanying drawings, in which embodiments of the disclosure are shown, and not intended to be limiting.

Figure 1:
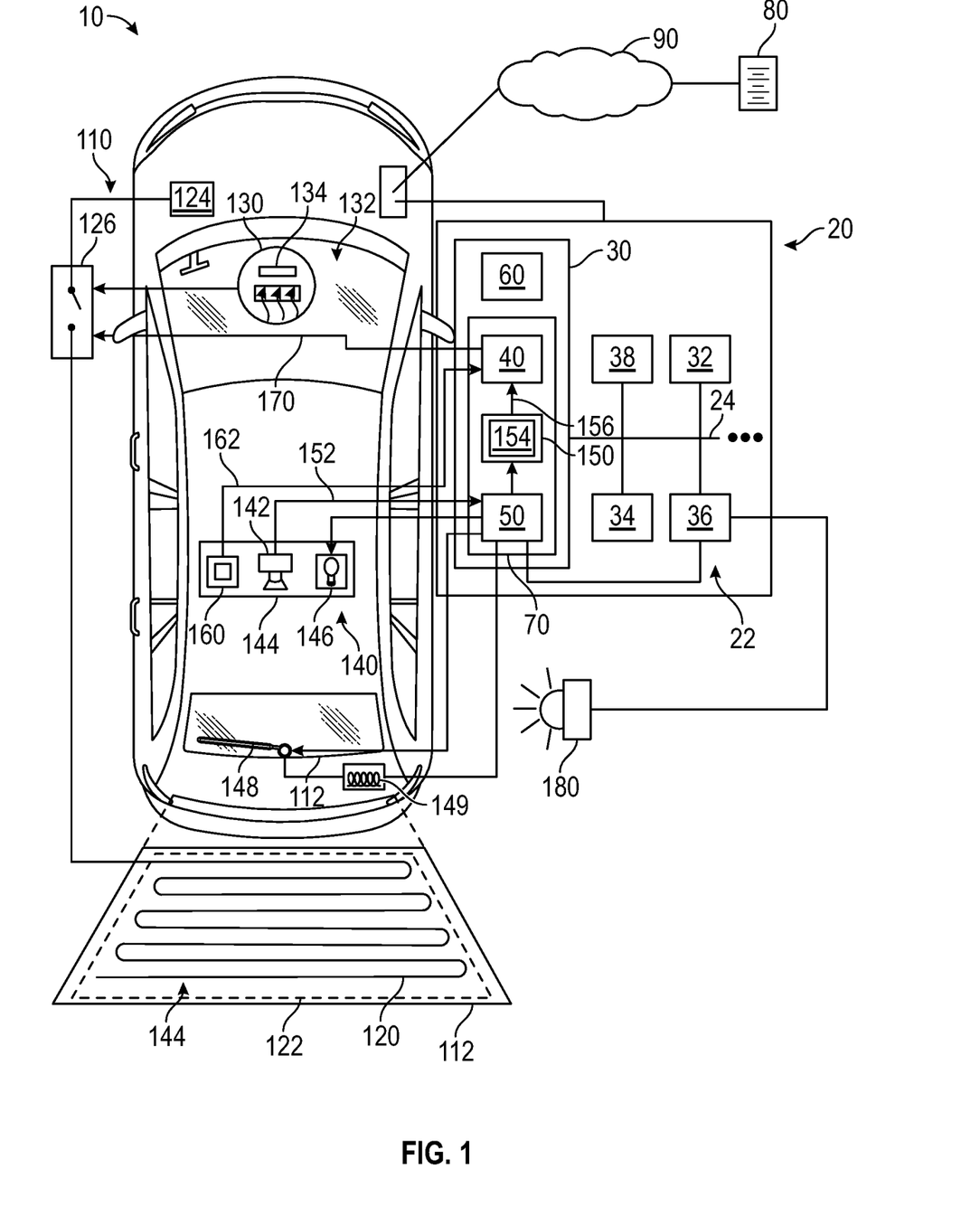
FIG. 1 depicts an example embodiment of a vehicle with a heating element controller in accordance with the present disclosure.

FIG. 1 depicts an example of a vehicle 10. The vehicle 10 may take the form of various passenger or commercial automobiles including a car, a truck, a sport utility, a crossover vehicle, a minivan, a taxi, a bus, etc., and may be configured to include various types of automotive drive systems. Example drive systems can include internal combustion engine (ICE) powertrains having a gasoline, diesel, or natural gas-powered combustion engine with conventional drive components such as a transmission, a drive shaft, a differential, etc.

The vehicle 10 may be configured as an electric vehicle (EV). More particularly, the vehicle 10 may include a battery EV (BEV) drive system or be configured as a hybrid EV (HEV) having an independent onboard power plant, a plug-in HEV (PHEV) that includes a HEV powertrain connectable to an external power source, and including a parallel or series hybrid powertrain having a combustion engine power plant and one or more EV drive systems. HEVs can include battery and/or supercapacitor banks for power storage, flywheel power storage systems, or other power generation and storage infrastructure. The vehicle 10 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

The vehicle 10 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

According to embodiments of the present disclosure, a heating element control system may be configured to operate with a vehicle having any level of autonomous vehicle controller, or with a human-operated vehicle.

The vehicle 10 includes a vehicle control unit (VCU) 20. The VCU 20 includes a plurality of electronic control units (ECUs) 22 that share a power bus 24. The VCU 20 can include or communicate with any combination of the ECUs 22 and is thereby configured to coordinate data between vehicle systems, connected servers, and other vehicles (not shown in FIG. 1) operating as part of a vehicle fleet. The VCU 20 may control various loads directly via the bus 24 or implement such control in conjunction with one of the ECUs 22.

The illustrated computing system architecture of the VCU 20 may omit certain computing modules. It should be readily understood that the computing environment depicted in FIG. 1 is one example of a possible implementation according to the present disclosure, and thus, it should not be considered limiting or exclusive.

The ECUs 22 control aspects of vehicle operation and communication using inputs from human drivers, inputs from an autonomous vehicle controller, and inputs from other controllers. The ECUs 22, when configured as nodes on the bus 24, may each include a central processing unit (CPU), a CAN controller, and/or a transceiver (not shown in FIG. 1). Example ECUs 22 include a Body Control Module (BCM) 30, an Engine Control Module (ECM) 32, a Transmission Control Module (TCM) 34, a Telematic Control Unit (TCU) 36, a Camera Image Graphical Processing Unit (CIGPU) 38, a Restraint Control Module (RCM), and the like.

The ECUs 22 described with respect to the VCU 20 are provided for example purposes only and are not intended to be limiting or exclusive. Control and/or communication with other control modules not shown in FIG. 1 is possible, and such control is contemplated.

The TCU 36 can be configured to provide vehicle connectivity to wireless computing systems onboard and off-board the vehicle 10 and is configurable for wireless communication between the vehicle 10 and other systems, computers, and modules. For example, the TCU 66 includes a Navigation (NAV) system for receiving and processing a GPS signal from a GPS, a Bluetooth® Low-Energy Module (BLEM), a Wi-Fi transceiver, an Ultra-Wide Band (UWB) transceiver, and/or other wireless transceivers (not shown in FIG. 1).

In addition, the TCU 36 generally includes wireless transmission and communication hardware that may be disposed in communication with one or more transceivers associated with telecommunications towers and other wireless telecommunications infrastructure. For example, a Bluetooth Low Energy module (BLEM) is configured and/or programmed to receive messages from, and transmit messages to, one or more cellular towers associated with a telecommunication provider, and/or and a Telematics Service Delivery Network (SDN) associated with the vehicle 10.

The BLEM may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM may include Generic Attribute Profile (GATT) device connectivity for client devices that respond to or initiate GATT commands and requests, and connect directly with a mobile device.

Referring to FIG. 1, the TCU 36 is illustrated as connecting to and controlling a light 180 of infrastructure such as a garage, driveway, house, or carport. Additionally, the TCU 36 can connect to and control an exterior light of another vehicle.

The BCM 30 and associated vehicle systems are now described in further detail. The BCM 30 includes integrated sensors, vehicle performance indicators, and variable reactors associated with vehicle systems, and may include processor-based power distribution circuitry that can control functions associated with the vehicle body such as lights, windows, security, door locks and access control, and various comfort controls.

The BCM 30 coordinates functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 30 is configured for vehicle energy management, exterior lighting control, wiper functionality and windshield fluid systems, power window and door functionality, heating ventilation and air conditioning systems, and driver integration systems. In other aspects, the BCM 30 controls auxiliary equipment functionality, and/or is responsible for integration of such functionality.

Referring to FIG. 1, the BCM 30 one or more processor(s) 60 disposed in communication with the respective computing systems (e.g., the memory 70 and/or one or more external databases not shown in FIG. 1).

The memory 70 may be a non-transitory computer-readable memory storing a program code configured to cause the processor(s) 60 to execute some or all of the disclosed steps. The memory 70 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The processor(s) 60 may utilize the memory 70 to store programs in code and/or to store data for performing aspects in accordance with the disclosure. Although an imaging controller 50 may be an element of the CIGPU 38, for purposes of teaching, the memory 70 is described as storing programs for controllers 40, 50. The controllers 40, 50 each include computer-readable instructions that are executable by the processor 60 to control vehicle systems described in further detail below in order to control a window heating system. The imaging controller 50 may be a sub-controller of the heating element controller 40.

Referring to FIG. 1, the vehicle 10 includes heating system 110 for a window 112. In FIG. 1, the window 112 is a rear window of the vehicle 10. However, it should be understood that the systems and methods described herein can be applied to any and more than one window of a vehicle.

The heating system 110 includes a heating element 114 configured to heat the window 112. The heating element 114 is integral or attached to the window 112 to apply heat to the window 112. The heating element 114 includes an array of wires 120 and a transparent film 122. The transparent film 122 holds the array of wires 120 in place such that the film 122 can be attached to or embedded within the glass of the window 112 to position the array of wires 120 on or within the window 112. The heating element 114 may also include film 122 include Suspended Metal Particle (SMP) technology where metal is homogeneously and evenly embedded throughout the film 122. When an electrical current is passed through the film 122, the SMP generates heat. For example, a method of forming the window 112 with a heating element 114 includes inserting the film 122 between two panes of glass that make up the window 112.

The heating element 114 is connected to a power supply 124 by a switch 126. When the switch 126 is closed, current flows through the array of wires 120 or SMP film. The heating element 114 is a resistive heating element in that heat is generated when current flows through the wires 120 or SMP film. Heat is generated as a function of the resistance of the wires 120 or SMP film.

The switch 126 is manually controlled by a control button 130 of a control panel 132 of the vehicle 10. When the switch 126 is open (i.e., an off state), pressing the control button 130 closes the switch 126 to turn on the heating element 114. The control button 130 has a light 134 that illuminates to show the heating element 114 is on. When the switch 126 is closed (i.e., an on state), pressing the control button 130 opens the switch 126 to turn the heating element 114 off and the light 134 goes off to show the heating element 114 is off.

Continuing with FIG. 1, the vehicle 10 includes an imaging system 140 that is configured to capture an image of the window 112. The imaging system 140 includes a camera 142 that is directed at the window 112. As illustrated, the camera 142 is positioned in an overhead console (OHC) 144 of the vehicle 10. The overhead console 144 is positioned on the ceiling of the vehicle 10 above a rear-most seating area of the vehicle 10. The camera 142 is directed at the rear window 112 of the vehicle 10.

It should be understood that the vehicle includes multiple cameras at various locations inside and outside of the vehicle. It is contemplated that one or more of these cameras are or can be configured to capture an image of the rear window or of other windows of the vehicle. For example, a camera may be positioned in a dash and/or a door of the vehicle.

The imaging system 140 further includes at least one light 146, 180 that is configured to illuminate the window 112. The light 146, 180 provides light to diffract off of frost/fog crystals on the glass of the window 112, for example, in dark low-visibility situations.

The light 146 illustrated in FIG. 1 is a cabin light housed in the overhead console 144 (e.g., a door-activated and/or manually activated light). However, the at least one light may additionally or alternatively include interior lights, exterior lights, and (IR) lights of the vehicle 10 that are used to illuminate the window 112. Exterior lights can include brake lights or reverse lights that are near the window 112. Other lights that are not near the window 112 may also be used where the light reflects off of an object to illuminate the window 112. Exterior IR illuminators may be preferred in certain situations as they are less noticeable to users.

The vehicle 10 may also command lights 180 in the general area to be activated (ex., garage interior light, drive-way lights, other vehicles, etc.). For example, the TCU 36 is configured to connect to and control light 180, which may be part of infrastructure or another vehicle.

The imaging system 140 further includes a wiper 148 that is positioned on the outside surface of the window 112 and configured to move across the outside surface of the window 112 to clear or clean the window 112. A glass cleaner fluid pump 149 is configured to apply cleaner coincident with one or more wiper 148 actions.

The camera 142, the lights 146, 180, the wiper 148, and the glass cleaner fluid pump 149 are controlled by the imaging controller 50, for example, according to methods described in further detail below. In particular, the imaging controller 50 is configured to provide instructions to control the camera systems, light systems, and wiper systems of the vehicle 10.

Control of the camera 142, the lights 146, 180, and the wiper 148 by the imaging controller 50 facilitates capturing images that are more easily classified by an analysis module 150. In particular, the imaging controller 50 controls the light 146, 180 to be on during a time when the imaging controller 50 controls the camera 142 to capture an image. As such, the light 146, 180 illuminates the window 112 to capture a better image (e.g., at night or in a dark space such as a parking garage).

The imaging controller 50 may also control the wiper 148 to operate during a time when the imaging controller 50 controls the camera 142 to capture one or more images. By tracking the wiper 148 or capturing an image that shows the wiper 148, a status of the window 112 may be more easily determined. For example, if the light 146 is activated, a reflection off the wiper 148 can be recognized in the image. The camera 142 can track the travel and characteristics of the wiper 148 image to assess the level of clearness of the window 112.

The imaging controller 50 may also operate the wiper 148 and the glass cleaner fluid pump 149 before an image is captured by the camera 142 to assist with defrosting/defogging the window 112 and facilitate obtaining an image that most accurately reflects the amount of heating that remains to clear the window 112. The use of the wiper 148 and glass cleaner fluid pump 149 minimizes the amount of defrosting/defogging to be performed by the heating element 114. As an example, operating the wiper 148 and applying fluid from the glass cleaner fluid pump 149 may change the state of the window 112 from frosted/fogged to clear, which is recognized by the system as described below, and the heating element 114 is shut off to save energy.

The imaging controller 50 is configured to send an image 152 of the window 112 captured by the camera 142 to the analysis module 150. The analysis module 150 may be part of the imaging controller 50, the heating element controller 40, another part of the VCU 20 such as the CIGPU 38, or may be on a remote server described in further detail below.

The analysis module 150 is configured to receive the image 152 from the imaging controller 50 and store the image in memory 70. The memory 70 further includes computer-readable instructions that, when executed by the processor 60, are configured to execute an image classifier algorithm 154 to classify the image 152.

The image classifier algorithm 154 classifies the image 152 as the window 112 having one of various states. In particular, various states include a first state where the window 112 is frosted or fogged and a second state where the window 112 is clear.

In some embodiments, the image classifier algorithm 154 is a neural network that is trained by images including images where the window 112 is frosted in the day with daylight, images where the window 112 is frosted in the night with light from a vehicle light 146, images wherein the window 112 is fogged in the day with daylight, images where the window 112 is fogged at night with light from a vehicle light 146, images where the window 112 is clear in the day with daylight, and images where the window 112 is clear at night with light from a vehicle light 146.

Once trained, the image classifier algorithm 154 determines a state confidence level 156. The state confidence level 156 is a probability or confidence level that an image of the window 112 is frosted or fogged.

In some cases, the image classifier algorithm 154 is trained with images of the wiper 148. For example, the more visible the wiper 148 in an image, the lower the confidence level that the image 152 is frosted or fogged.

Continuing with FIG. 1, the vehicle 10 further includes a humidity sensor 160. For example, the humidity sensor 160 is positioned in the overhead console 144. In some embodiments, the humidity sensor 160 is a capacitive lamp sensor that is also used to turn on/off the console light 146. The vehicle 10 is further configured to receive local measurements of humidity in the environment via offboard humidity readers/sensors or local weather reports (e.g., humidity measurements provided by server 80).

The humidity sensor 160 measures the humidity measurement 162 in the vehicle 10. The imaging controller 50 or the heating element controller 40 controls the humidity sensor 160 such that the humidity measurement 162 is measured as an image 152 is captured by the camera 142.

The heating element controller 40 may receive the state confidence level 156 from the analysis module 150 and receives the humidity measurement 162 from the humidity sensor 160. The heating element controller 40 controls the heating element 114 based on the state confidence level 156 and the humidity measurement 162. In particular, the heating element controller 40 is configured to generate a control output 170 to open and close the switch 126. An example method 200 of generating the control output 170 based on the state confidence level 156 and the humidity measurement 162 is now described with reference to FIG. 2.

Figure 2:
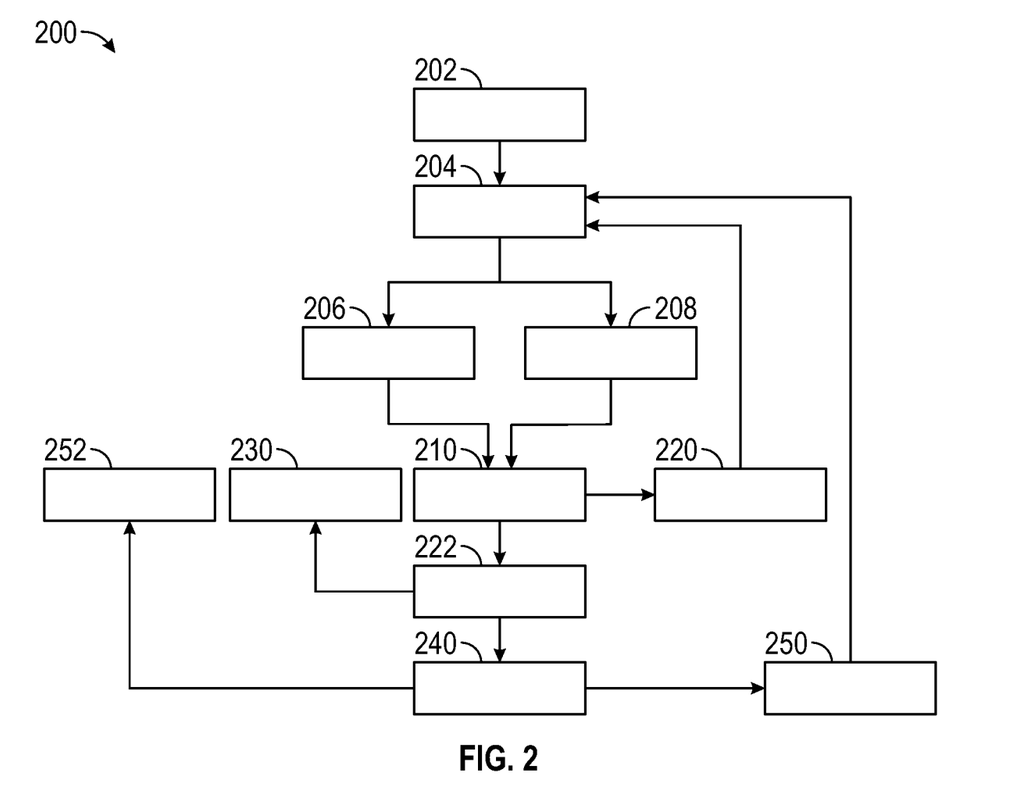
FIG. 2 depicts an example embodiment of a flow diagram illustrating a method for controlling a window heating element with a heating element controller in accordance with the present disclosure.

Referring to the method 200 of FIG. 2, at a step 202, the heating element controller 40 determines if the switch 126 is open or closed. If the switch 126 is closed, the method 200 determines whether the heating element 114 should remain on or should be turned off. If the switch 126 is open, the method 200 determines whether the heating element 114 should remain off or should be turned on.

As one example, the control button 130 is engaged and the switch 126 is closed manually. Accordingly, the heating element 114 is on and current moves through the array of wires 120 to heat the window 112. The heating element controller 40 monitors the switch 126 to determine if the switch 126 is open or closed. Upon determining that the switch 126 is closed, the next step is triggered.

According to a step 204, the heating element controller 40 instructs the imaging controller 50 to obtain an image 152 of the window 112 and provide the image 152 to the analysis module 150. The imaging controller 50 controls the camera 142 to obtain an image 152 of the window 112 and provides the image 152 to the analysis module 150.

To improve the image 152 that is obtained by the camera 142 (e.g., at night or low-light conditions), at the step 204, the imaging controller 50 controls the light 146, 180 to be on at least during the time the image 152 is obtained. In addition, in certain embodiments, at the step 204, the imaging controller 50 controls the wiper 148 glass cleaner fluid pump 149 to operate before and/or during the time the image 152 is obtained.

According to a step 206, the analysis module 150 classifies the image 152 with the image classifier algorithm 154. In classifying the image 152, the analysis module 150 determines a state confidence level 156. The state confidence level 156 is a probability or confidence level that the state of the window 112 is fogged or frosted. Here, images 152 of the window 112 that are completely fogged/frosted result in a high confidence level, images 152 of the window 112 that are completely clear result in a low confidence level, and images of the window that are in between completely fogged/frosted and completely clear result in an intermediate or medium confidence level.

In some embodiments, the imaging controller 50 also, at a step 208, instructs the humidity sensor 160 to provide, or otherwise receives, a humidity measurement 162 at the time the camera 142 obtains the image 152.

According to a step 210, the state confidence level 156 and the humidity measurement 162 are received or accessed by the heating element controller 40. The state confidence level 156 and the humidity measurement 162 are output from the analysis module 150 (e.g., step 206) and the humidity sensor 160 (e.g., step 208).

Figure 3:
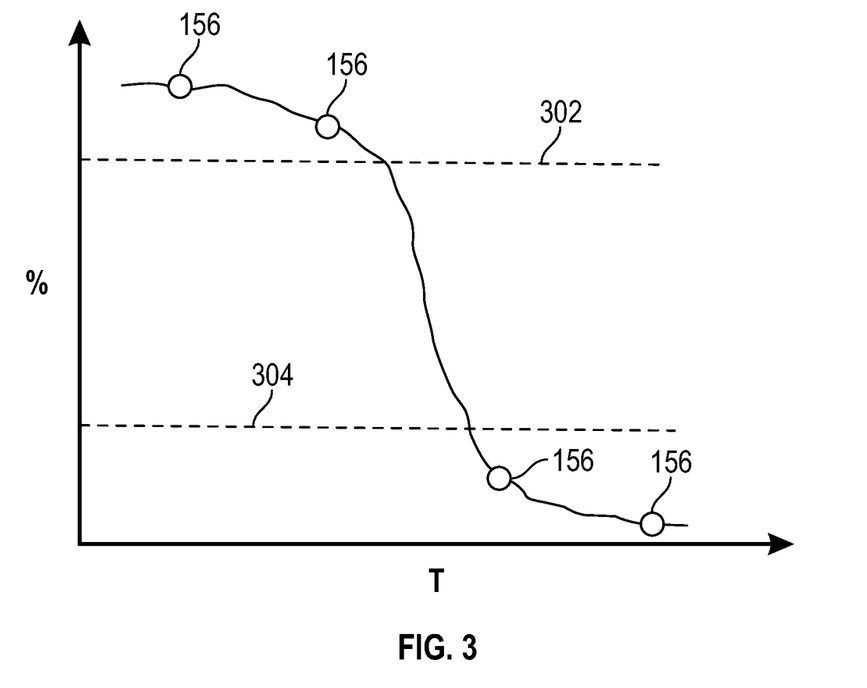
FIG. 3 depicts a graphical representation of a window state confidence level in accordance with the present disclosure.

According to a step 210, the heating element controller 40 determines if the state confidence level 156 (the confidence level that the window 112 is fogged/frosted) is above an upper threshold UT 302 (shown in FIG. 3).

According to a step 220, if the state confidence level 156 is above the upper threshold UT 302, the heating element controller 40 leaves the heating element 114 on and sets a timer. Once the timer expires, the heating element controller 40 starts the method 200 again at step 204.

According to a step 222, if the state confidence level 156 is below the upper threshold UT 302, the heating element controller 40 determines if the state confidence level 156 is below a lower threshold LT 304 (shown in FIG. 3).

According to a step 230, if the state confidence level 156 is below the lower threshold LT 304, the heating element controller 40 turns the heating element 114 off.

Figure 4:
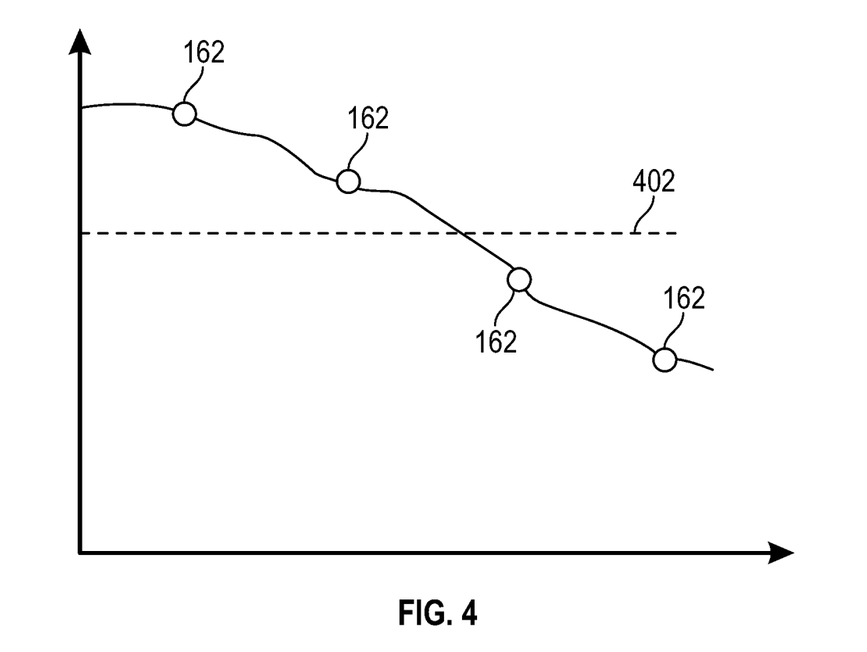
FIG. 4 is a graphical representation of a humidity measurement in accordance with the present disclosure.

According to a step 240, if the state confidence level 156 is above the lower threshold LT 304, the heating element controller 40 determines if the humidity measurement 162 is above a humidity threshold HT 402 (shown in FIG. 4). The humidity threshold HT 402 represents a humidity level or range of humidity (e.g., for a certain temperature or for a certain difference in surface temperatures) above which the window 112 is predicted to be fogged and below which the window 112 is predicted to be clear. Fogging occurs when warmer humid air contacts cooler surfaces and frosting occurs when this happens near freezing. The humidity threshold HT 402 may be determined based on at least one of temperature (e.g., as measured by temperature sensors) and deltas in surface temperatures (e.g., as measured by interior and exterior surface temperature sensors).

According to a step 250, if the humidity measurement 162 is above the humidity threshold HT 402, the heating element controller 40 leaves the heating element 114 on and sets a timer. Once the timer expires, the heating element controller 40 starts the method 200 again at step 204.

In certain embodiments, at the step 250, the heating element controller 40 takes further defogging measures through control of the systems of the vehicle 10 by the BCM 30 (or other ECUs 22 or the VCU 20) such as controlling the air temperature and fan speed of the ventilation system, activating the glass cleaner fluid pump 149 to apply cleaner coincident with one or more wiper 148 actions, and closing vents of the ventilation system to increase airflow and pressure on the window 112. For example, the BCM 30 may close vents for front-row side windows.

According to a step 252, if the humidity measurement 162 is below the humidity threshold HT 402, the heating element controller 40 turns the heating element 114 off.

Even if the heating element 114 is off, in some cases, the method 200 may begin at step 204 to determine if the heating element 114 should be turned on automatically by the heating element controller 40. For example, step 204 described above is initiated by starting the vehicle 10 and the subsequent steps are used to determine if the window is fogged or frosted and the heating element should be turned on (rather than left on). Then, the method 200 is repeated from step 204 to determine when the heating element 114 should be turned off.

Figure 5:
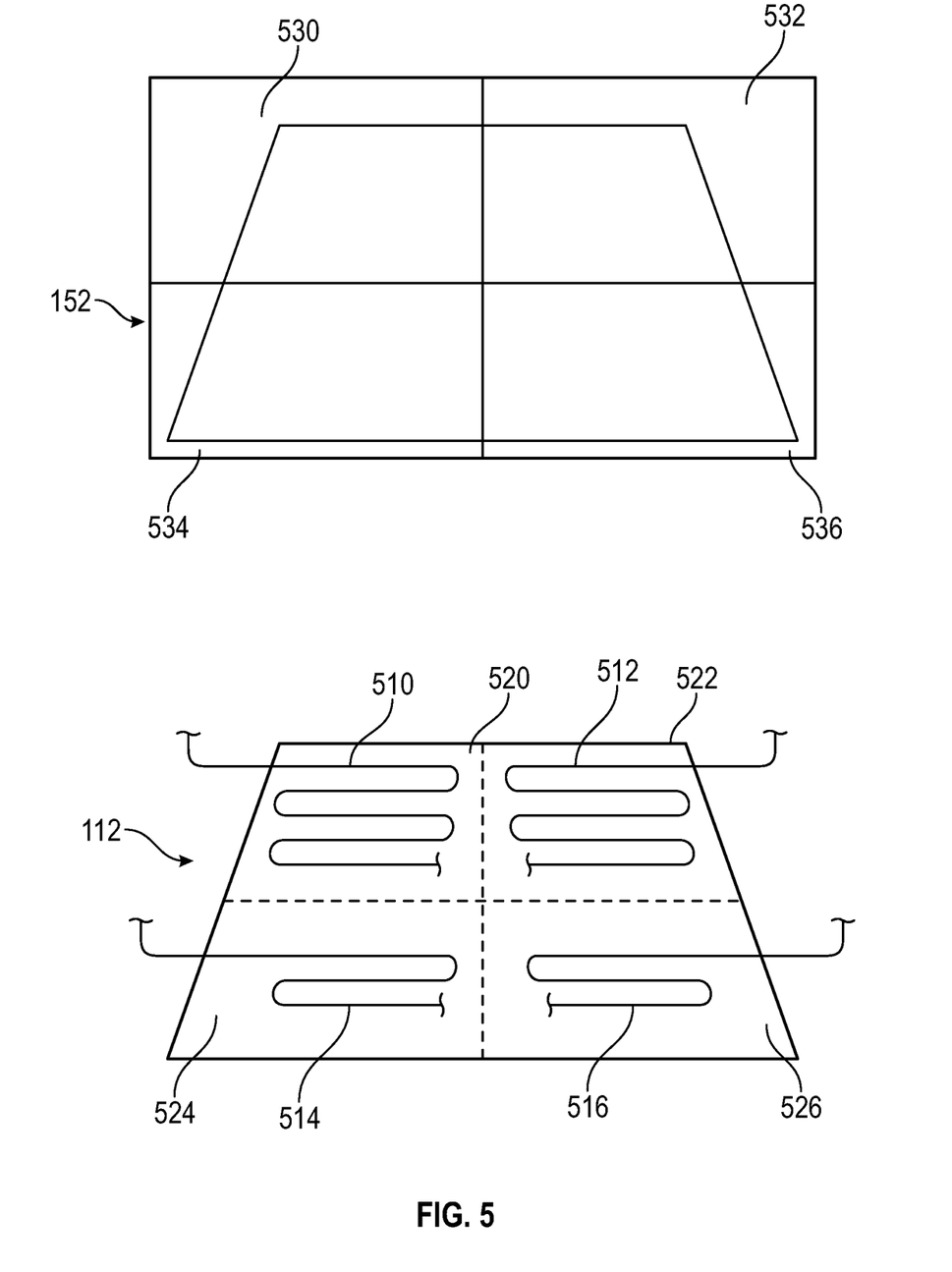
FIG. 5 is an example embodiment of a window with multiple heating elements and an associated image in accordance with the present disclosure.

Referring to FIG. 5, in some embodiments, a window 112 includes multiple heating elements 510, 512, 514, 516 with each heating element 510, 512, 514, 516 directed to a different portion 520, 522, 524, 526 of the window 112. Multiple images from multiple cameras and/or portions 530, 532, 534, 536 of an image 152 from a single camera are associated with the portions 520, 522, 524, 526 of the window 112.

As such, the systems and methods described above can be applied with greater resolution. This is advantageous, particularly when a window 112 is partially frosted or fogged (e.g., due to assistance from the wiper 148, glass cleaner fluid pump 149, and/or partially sun loading), to selectively heat the portions 520, 522, 524, 526 of the window 112 with an associated heating element 510, 512, 514, 516.

Referring again to FIG. 1, the controllers 40, 50, the analysis module 150 and image classifier algorithm 154, or other features of the BCM 30 or VCU 20 may, in some example embodiments, be provided via one or more server(s) 80 that are disposed in communication with the vehicle 10 (e.g., the TCU 36 of the VCU 20) via one or more networks 90. The server(s) 80 may be part of a cloud-based computing infrastructure and may be associated with and/or include a Telematics Service Delivery Network (SDN) that provides digital data services to the vehicle 10 and other vehicles (not shown in FIG. 1) that may be part of a vehicle fleet.

For example, the controllers 40, 50 may be disposed in communication with the server(s) 80, which may also serve as the SDN, where the server(s) 80 includes the analysis module 150.

The network(s) 90 illustrate an example of a communication infrastructure in which the connected devices discussed in various embodiments of this disclosure may communicate. The network(s) 90 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A system, comprising:
    a heating element configured to heat a rear window of a vehicle;
    a camera configured to capture an image of the rear window;
    an analysis module, wherein the analysis module includes an algorithm that is configured to, based on the image, identify a state of the rear window, and wherein the state includes a first state that is one of frosted or fogged and a second state that is clear; and
    a controller configured to:
        control a wiper to move over the rear window at a same time the camera captures the image of the rear window such that the image of the rear window includes the wiper, wherein the state of the rear window is determined based on a level of visibility of the wiper in the image; and
        control the heating element based on the state of the rear window such that:
            if the state is the first state, the heating element remains on; and
            if the state is the second state, the heating element is turned off.

2. The system of claim 1, further comprising a light configured to illuminate the rear window.

3. The system of claim 2, wherein the controller is configured to control the light to illuminate the rear window and the camera to capture the image of the rear window, and wherein the controller controls the light to illuminate the rear window at a same time the controller controls the camera to capture the image of the rear window.

4. The system of claim 1, wherein the state of the rear window is based on a confidence level that the state of the rear window is the first state.

5. The system of claim 4, wherein the state of the rear window is the first state if the confidence level is above an upper threshold, and wherein the state of the rear window is the second state if the confidence level is below a lower threshold.

6. The system of claim 5, wherein the confidence level is below the upper threshold and above the lower threshold.

7. The system of claim 6, further comprising a humidity sensor configured to measure a humidity measurement and a temperature sensor configured to measure a temperature; and
    wherein the controller is configured to control the heating element based on the humidity measurement and the temperature.

8. The system of claim 1, wherein the controller controls the wiper to move over the rear window before the controller controls the camera to capture the image of the rear window.

9. The system of claim 1, wherein the heating element is a resistive heating element.

10. The system of claim 1, wherein the heating element includes at least one of an array of wires embedded in the rear window or metal particles in a film.

11. A method, comprising:
    heating, with a heating element of a vehicle, a rear window of the vehicle;
    capturing an image of the rear window with a camera of the vehicle;
    controlling a wiper to move over the rear window at a same time the camera captures the image of the rear window such that the image of the rear window includes the wiper;
    determining a state of the rear window based on a level of visibility of the wiper in the image, wherein the state includes a first state that is one of frosted or fogged and a second state that is clear; and
    controlling the heating element based on the state of the rear window, wherein the heating element is controlled to remain on based on the state being the first state, and wherein the heating element is controlled to turn off based on the state being the second state.

12. The method of claim 11, further comprising controlling a light to illuminate the rear window.

13. The method of claim 11, wherein the state of the rear window is based on a confidence level that the state of the rear window is the first state.

14. The method of claim 13, wherein the state of the rear window is the first state based on the confidence level being above an upper threshold, and wherein the state of the rear window is the second state based on the confidence level being below a lower threshold.

15. The method of claim 14, wherein the confidence level is below the upper threshold and above the lower threshold.

16. The method of claim 15, further comprising:
measuring a humidity measurement in the vehicle with a humidity sensor of the vehicle;
measuring a temperature in the vehicle with a temperature sensor of the vehicle; and
controlling the heating element based on the humidity measurement and the temperature.

* * * * *